(12) United States Patent
Protopapas

(10) Patent No.: US 8,937,528 B2
(45) Date of Patent: Jan. 20, 2015

(54) APPARATUS AND METHOD FOR REGISTERING USERS AND MANAGING BIOMETRIC DATA THEREOF IN A VEHICLE

(75) Inventor: Maria Eugenia Protopapas, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 13/611,934

(22) Filed: Sep. 12, 2012

(65) Prior Publication Data

US 2014/0070917 A1 Mar. 13, 2014

(51) Int. Cl.
*B60R 25/00* (2013.01)
*G05B 19/00* (2006.01)
*G05B 23/00* (2006.01)
*G06F 7/00* (2006.01)
*G06F 7/04* (2006.01)
*G08B 29/00* (2006.01)
*G08C 19/00* (2006.01)
*H04B 1/00* (2006.01)
*H04B 3/00* (2006.01)
*H04Q 1/00* (2006.01)
*H04Q 9/00* (2006.01)

(52) U.S. Cl.
USPC ................ 340/5.72; 340/5.52; 340/5.82

(58) Field of Classification Search
CPC ... B60R 25/04; B60R 2325/101; G06F 21/32; G07C 9/00158; H04L 63/0861
USPC ............. 340/5.52–5.53, 5.72, 5.8, 5.81–5.84, 340/5.7
See application file for complete search history.

(56) References Cited

U.S. PATENT DOCUMENTS

| | | | |
|---|---|---|---|
| 5,469,506 A | 11/1995 | Berson et al. | |
| 6,078,265 A * | 6/2000 | Bonder et al. | 340/5.23 |
| 6,140,939 A | 10/2000 | Flick | |
| 6,727,800 B1 | 4/2004 | Dutu | |
| 6,898,299 B1 * | 5/2005 | Brooks | 382/115 |
| 6,992,562 B2 | 1/2006 | Fuks et al. | |
| 7,233,227 B2 * | 6/2007 | Lemoult | 340/5.62 |
| 7,254,619 B2 | 8/2007 | Mekata et al. | |
| 7,596,391 B2 | 9/2009 | Himmelstein | |
| 7,822,232 B2 | 10/2010 | Black | |

(Continued)

FOREIGN PATENT DOCUMENTS

| | | | | | |
|---|---|---|---|---|---|
| JP | 2003178032 A * | 6/2003 | | | G06F 15/00 |
| WO | WO 2005/018137 A1 * | 2/2005 | | | H04L 9/32 |
| WO | WO 2008/043125 A1 * | 4/2008 | | | H04L 9/32 |

*Primary Examiner* — Hai Phan
*Assistant Examiner* — Orlando Bousono
(74) *Attorney, Agent, or Firm* — Jennifer M. Stec; Brooks Kushman P.C.

(57) ABSTRACT

An apparatus for managing biometric information for a vehicle is provided. The apparatus comprising a first key, a second key, and a vehicle controller. The first and the second key each for transmitting an access signal to the vehicle. The vehicle controller for receiving the access signal from one of the first key and the second key to enable operation of the vehicle. The vehicle controller being operably coupled to a biometric database for storing first data indicative of an administrator and second data indicative of at least one of a member and biometric information for the member. The vehicle controller being configured to receive the access signal from each of the first key and the second key and to determine that a user is the administrator in response to receiving the access signal from each of the first key and the second key.

17 Claims, 5 Drawing Sheets

(56) References Cited

U.S. PATENT DOCUMENTS

| | | |
|---|---|---|
| 7,921,297 B2 | 4/2011 | Ortiz et al. |
| 2003/0204290 A1 | 10/2003 | Sadler et al. |
| 2004/0075530 A1* | 4/2004 | Ghabra et al. ............... 340/5.6 |
| 2005/0193212 A1 | 9/2005 | Yuhara |
| 2005/0248444 A1* | 11/2005 | Joao ........................ 340/426.13 |
| 2006/0055509 A1 | 3/2006 | Teshima et al. |
| 2006/0097844 A1 | 5/2006 | Nakashima et al. |
| 2007/0200663 A1* | 8/2007 | White et al. ............... 340/5.31 |
| 2010/0217457 A1* | 8/2010 | Georgi et al. .................... 701/2 |
| 2011/0068895 A1* | 3/2011 | Gee et al. ................... 340/5.67 |
| 2011/0205016 A1* | 8/2011 | Al-Azem et al. ........... 340/5.52 |
| 2011/0215901 A1* | 9/2011 | Van Wiemeersch et al. 340/5.54 |
| 2011/0215921 A1* | 9/2011 | Ben Ayed et al. ....... 340/539.11 |
| 2011/0241838 A1* | 10/2011 | Wischmeyer ............... 340/10.1 |

* cited by examiner

APPARATUS AND METHOD FOR REGISTERING USERS AND MANAGING BIOMETRIC DATA THEREOF IN A VEHICLE

TECHNICAL FIELD

Embodiments disclosed herein general relate to an apparatus and method for registering users and managing biometric data for the users in a vehicle.

BACKGROUND

It is known to provide a biometric sensor and a database including a list of authorized users for a vehicle. One example of such an implementation is disclosed in U.S. Pat. No. 6,992,562 ("the '562 patent") to Fuks et al.

The '562 patent discloses a system and method that employs a wireless remote keyless entry device to provide entry to a remote system via the wireless device. The system provides a level of authorization and eliminates a complex integration with the remote system to which entry is sought. The remote keyless entry device preferably includes a biometric sensor for receiving a biometric input value and a database including a list of authorized users. Each authorized user has a biometric value and a set of command options associated therewith. Each command option has a command code associated therewith. The device and method allow for one-way secure communication with the remote system, and also provide added functionality and tracking features

SUMMARY

An apparatus for managing biometric information for a vehicle is provided. The apparatus comprising a first key, a second key, and a vehicle controller. The first and the second key each for transmitting an access signal to the vehicle. The vehicle controller for receiving the access signal from one of the first key and the second key to enable operation of the vehicle. The vehicle controller being operably coupled to a biometric database for storing first data indicative of an administrator and second data indicative of at least one of a member and biometric information for the member. The vehicle controller being configured to receive the access signal from each of the first key and the second key and to determine that a user is the administrator in response to receiving the access signal from each of the first key and the second key.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, RAM, ROM, EPROM, EEPROM, or other suitable variants thereof) and software which co-act with one another to perform operation(s) disclosed herein.

Embodiments disclosed herein generally provide for an apparatus and method for registering users and managing biometric data for the users of a vehicle. Such an apparatus and method may create a biometric database for the user of the vehicle. In addition, the apparatus and the method may capture biometric information and associate the same to the various users for storage in the biometric database. The apparatus and method may also enable the user to manage biometric data for various users in a fleet vehicle setting.

Figure 1:
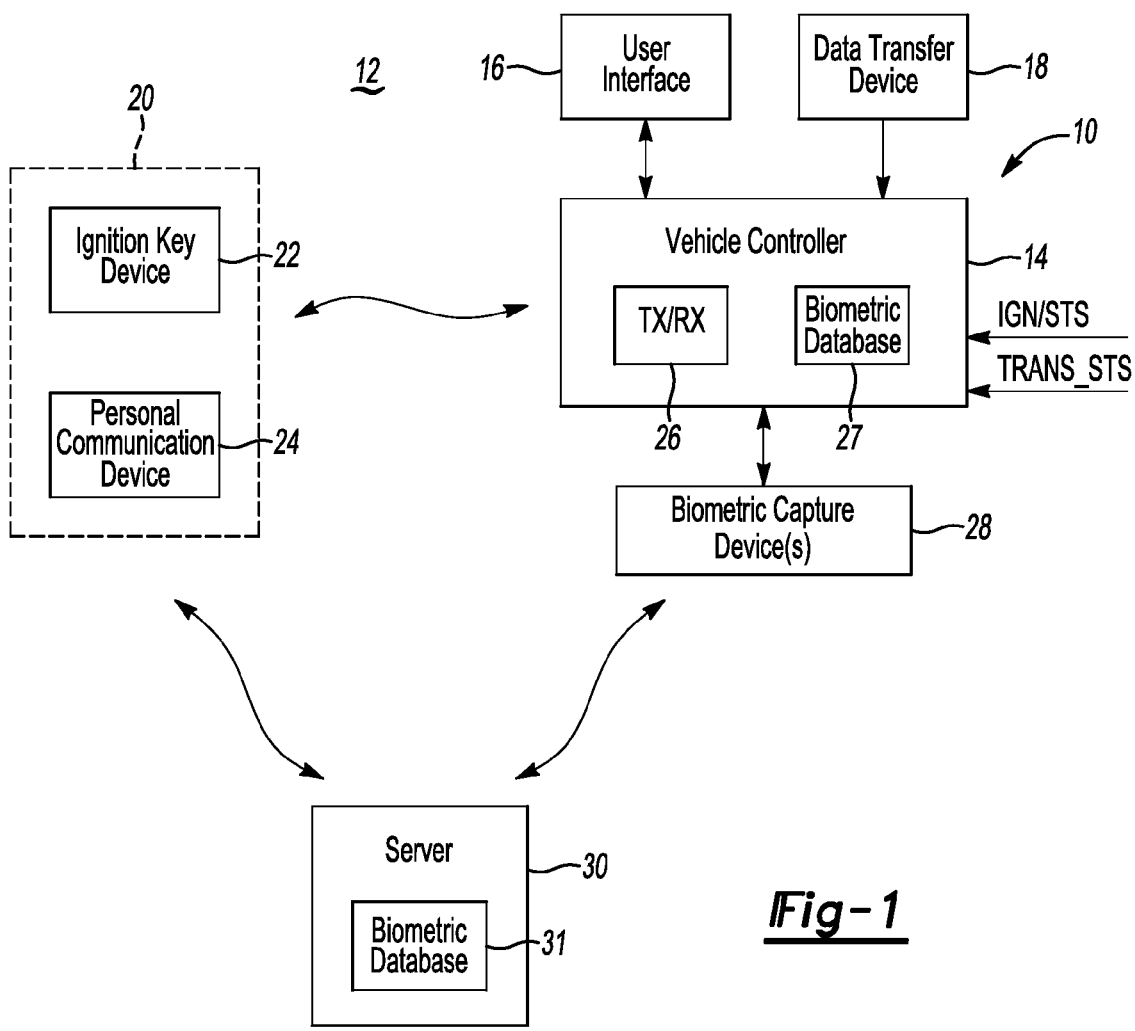
FIG. 1 depicts an apparatus for registering and managing biometric data in a vehicle in accordance to one embodiment.

FIG. 1 depicts an apparatus 10 for registering users and managing biometric data thereof in a vehicle 12 in accordance to one embodiment. The apparatus 10 includes a vehicle controller 14 for controlling various operations of the vehicle 12. In one example, the vehicle controller 14 may be configured to control a number of vehicle electronic operations, such as but not limited to, interior/exterior locking, interior/exterior lighting, climate control, etc. A user interface 16 is operably coupled to the vehicle controller 14. The vehicle controller 14 and the user interface 16 may be implemented as an integrated unit or may be separate from one another. A user may select various operations via the user interface 16 such that the vehicle controller 14 performs the selected operation. The vehicle controller 14 may also provide status messages or indicators related to the status of a particular vehicle operation to the user interface 16 for display to the user. For example, a low fuel warning message, low windshield fluid warning, a top speed limit warning, speed alert, entry/exit messages, etc. may be provided to the user via the user interface 16.

A data transfer device 18 is operably coupled to the vehicle controller 14. In one example, the data transfer device 18 may be a memory device such as a USB stick or other suitable device for transferring data loaded therein to the vehicle controller 14. An entry transmitting device 20 is operably coupled to the vehicle controller 14 to obtain access to the vehicle 12. The entry transmitting device 20 generally includes a plurality of ignition key devices 22 and/or a personal communication device (PCD) 24. The ignition key device 22 generally includes a transponder for wirelessly transmitting encrypted data to the vehicle controller 14 to gain entry into the vehicle 12. In one example, the ignition key device 22 may be an ignition key with the transponder positioned on a portion thereof for use in a passive anti-theft system (PATS). In another example, the ignition key device may be a card based device that includes the transponder in which the transponder and the vehicle exchange data therebetween to authorize entry to the user without the use of an ignition key as used in connection with a Passive Entry Passive Start (PEPS) system.

The PCD 24 may be a cellular phone or other suitable device that enables wireless communication exchange between users. The PCD 24 may also transmit signals to the vehicle 12 to obtain access thereof. For example, the PCD 24 may be a smart phone or iPhone®. The vehicle controller 14 generally includes a plurality of transmitters and receivers 26 for transmitting and receiving data. For example, the plurality of transmitters and receivers 26 may include a frequency-based transmitter/receiver for transmitting and receiving data to/from the ignition key device 22 in either a low frequency (LF) mode or in a radio frequency (RF) mode. In another example, the plurality of transmitters and receivers 26 may include a Bluetooth® based transmitter/receiver for transmitting and receiving data to/from the PCD 24 in accordance to the Bluetooth protocol. In yet another example, the plurality of transmitters and receivers 26 may include a WiFi transmitter/receiver for transmitting and receiving data to/from the PCD 24.

A biometric capture device 28 is operably coupled to the vehicle controller 14. The biometric capture device 28 generally comprises at least one of a camera, iris or retinal (e.g., eye scanner), fingerprint sensor, or voice recognition unit. In one example, the biometric capture device 28 is configured to transmit a control signal to the vehicle controller 14 to enable the same to unlock the vehicle 12 upon recognition of an authorized user based on biometric data. The camera may capture a facial image of the user and transmit the control signal to the vehicle controller 14 to unlock the vehicle in the event the image matches a previously stored image of an authorized user. The eye scanner may capture an image of the user's iris or retina and transmit the control signal to the vehicle controller 14 to unlock the vehicle 12 in the event the image matches a previously stored iris/retinal image of an authorized user. Also, the fingerprint sensor may transmit the control signal to the vehicle controller 14 to unlock the vehicle 12 in the event detected fingerprint(s) of a user matches previously stored images of fingerprint(s) of an authorized user. In addition, the voice recognition unit may transmit the control signal to the vehicle controller 14 in the event the recorded voice of the user matches a previously stored version of an authorized user's voice. In another example, the vehicle controller 14 may alternatively store images of the authorized user, store images of the fingerprints belonging to an authorized user, and store a version of the authorized user's voice. In this condition, the vehicle controller 14 may compare the images as received and/or the recorded voice of the user to the previously store data to determine if a match exists. In the event, one or more of the comparisons reveal that a match exists; the vehicle controller 14 may enable the authorized user to enter into the vehicle 12.

A server 30 is operably coupled to the vehicle controller 14. The server 30 is coupled to the vehicle controller 14 via a wireless connection (e.g., via the plurality of transmitters/receivers 26). For example, the vehicle controller 14 and the server 30 may engage in bi-directional transfer of information via the WiFi receiver. The server 30 may include a biometric database of authorized users (e.g., administrator and member) for various vehicles. For example, the server 30 may receive a listing of authorized users and corresponding biometric data for any number of vehicles. Such data may be uploaded to the server 30 for each respective vehicle and store under the particular vehicle identification number (VIN) or other identifier.

The vehicle controller 14 generally includes a biometric database 27. The biometric database 27 generally includes various users who are registered thereto such as the administrator and member(s). The administrator may add or delete members as needed. The administrator and/or the members (once added) can provide biometric data (e.g., the captured image of authorized user (e.g., facial, iris, retinal, etc.), the captured image of fingerprints for the authorized user, and/or the recorded voice of the authorized user) for storage on the biometric database 27. In addition, the administrator and the various members may transmit the biometric data on the biometric database 27 of the vehicle 12 to the data transfer device 18 and/or to the server 30. The administrator and the various members registered to the biometric database 27 may transmit their respective biometric data on the biometric database 27 of the vehicle 12 to the data transfer device 18 and/or to the server 30.

The server 30 may receive the biometric data from a corresponding vehicle 12. In this case, an administrator may control the server 30 to selectively transmit data for the authorized user included within the biometric database(s) to different vehicles. In addition, a server administrator may control the server 30 to selectively transmit member and/or biometric data for such a member to different vehicles. This may occur, for example, in a fleet vehicle setting in the event various drivers are being reassigned to different vehicles within the fleet and where it may be necessary to upload the biometric data for a particular authorized member into the newly assigned vehicle 12. Likewise, the biometric data for the newly assigned member may be removed or deleted from the vehicle 12 in which the authorized user is being transferred from. For example, the server 30 may wirelessly transmit a signal indicative of a delete command for a member to the vehicle controller 14 to delete the biometric data for the transferred member so that the transferred member no longer has entry rights to the respective vehicle 12. In addition, the biometric data (e.g., the captured image of authorized user, the captured image of fingerprints for the authorized user, and/or the recorded voice of the authorized user) may be collected from a central location (e.g., office(s) affiliated with the provider of the fleet vehicles), stored into the server 30, and selectively uploaded to the assigned vehicle 12. Likewise, the capability of the server 30 may be extended into vehicle-to-vehicle communication. For example, vehicles may transmit and receive biometric data to/from one another via the transmitters/receivers 26.

Figure 2:
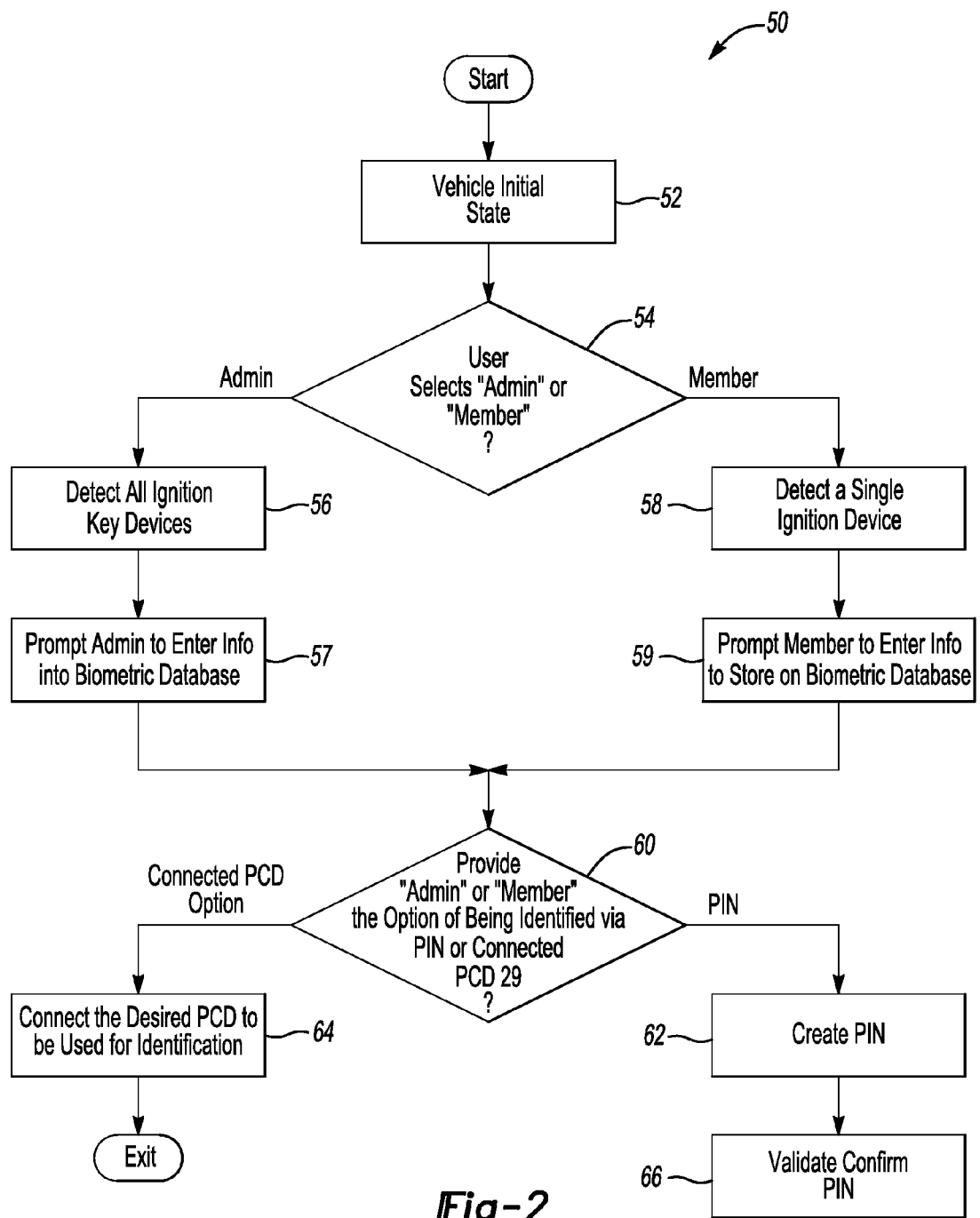
FIG. 2 depicts a method for managing a biometric data in the vehicle in accordance to one embodiment.

FIG. 2 depicts a method 50 for managing the biometric data in the vehicle 12 in accordance to one embodiment. The method 50 generally enables a user to establish himself/herself as an administrator or an authorized user (or member). The administrator may be the individual who owns the vehicle or has greater control over the vehicle than the authorized user (or the member). The member may have rights to operate the vehicle, but may be under the control of the administrator. It is recognized that the administrator is also an authorized user. The administrator and the member each have the option of identifying themselves to the biometric database 27 by entering a personal identification number (PIN) or by recognition of a PCD 24 that belongs to either the administrator or the member.

In operation 52, the vehicle 12 is running and in PARK. For example, the vehicle controller 14 determines that the ignition status is in the "RUN" position and that the vehicle is in "PARK" based on signals IGN_STS and TRANS_STS (see FIG. 1) prior to enabling the user the ability to establish himself/herself as an administrator or member. To accomplish the above, the user may use the PATS based ignition key device 22 or the PEPS based ignition key device 22 to place the ignition status into the "RUN" position. By maintaining that the vehicle 12 is running and in PARK, this condition may ensure that the battery state of charge is not diminished while various operations of the method 50 are executed.

In operation 54, the user interface 16 receives a command from the user which indicates whether the user is to establish himself/herself as an administrator or as a member. If the user selects "administrator", then the method 50 moves to operation 56. If the user selects "member", then the method 50 moves to operation 58.

In operation 56, the user interface 16 instructs the user to obtain all of the ignition key devices 22 that came with the vehicle 12 upon purchase or that are all that currently programmed to the vehicle 12. As noted above, the ignition key device 22 may comprise a PATS based ignition key device or a PEPS based ignition key device. In the event the vehicle was purchased with PATS, then all of such PATS ignition key devices are collected. Likewise, in the vehicle was purchased with PEPS, then all of such PEPS ignition key devices are collected. In general, original equipment manufactures (OEMs) may provide up to two ignition key devices when the vehicle 12 is originally purchased. The vehicle controller 14 waits to receive a valid input (or access signal) from each of such ignition key devices. For example, the user may simply press the unlock/lock switch for each ignition key device 22 (e.g., irrespective of whether the ignition key device is PATS based or PEPS based) so that the vehicle controller 14 ascertains if all of such ignition key devices 22 have been detected. Alternatively, while the vehicle 12 is in run and in PARK, the user may simply take the mechanical key normally packaged with the PEPS based ignition key device 22 and cycle in the ignition switch within a specified time so that the vehicle controller 14 detects the presence of the PEPS based ignition key device 22. The PEPS based ignition key device 22 generally includes a removable or retractable mechanical ignition key to allow the user to start the vehicle in the event the PEPS based ignition key device has a low battery or other malfunction.

The vehicle controller 14 includes a look up table (LUT) that stores data indicative of all of the ignition key devices 22 that are programmed thereto. Each ignition key device 22 transmits the desired operation (e.g., unlock/lock) with a unique identifier so that the vehicle controller 14 can ascertain the identity of the ignition key device 22. The vehicle controller 14 may be configured to enable receipt of the signals from all of the ignition key devices 22 within a predetermined timeframe. If the vehicle controller 14 receives the signals from all of the ignition key device (e.g., two or more) within a predetermined time frame, then the method 50 proceeds to operation 57. In this case, the vehicle 12 determines that the user (i.e., the holder of the ignition key devices 22) is the administrator.

In operation 57, the user interface 16 prompts the user to input his/her name where such information is then transmitted to the vehicle controller 14 for storage on the biometric database 27, 31. In this case the administrator and corresponding name is stored or established on the biometric database 27, 31.

Operation 58 is generally similar to operation 56. However, the exception is that the user is required to use a single ignition key device 22 (or some other sample size that is less than the number of ignition key devices 22 required to establish the administrator).

In operation 59, the user interface 16 prompts the user to input his/her name where such information is then transmitted to the vehicle controller 14 for storage on the biometric database 27, 31. In this case the member and corresponding name is stored or established on the biometric database 27, 31.

In operation 60, the user interface 16 provides the user the option of being identified to the biometric database 27, 30 via a PIN or by the user's PCD 24. If the user selects the PIN option, then the method 50 moves to operation 62. If the user selects the PCD option, then the method 50 moves to operation 64.

In operation 62, the user interface 16 prompts the user to provide/create the PIN.

In operation 66, the user interface 16 confirms the PIN.

In operation 64, the user interface 16 may prompt the user to control the PCD 24 to transmit a Bluetooth based signal therefrom within a specified time interval to recognize the PCD 24 to the administrator or to the member. If the vehicle controller 14 detects that a PCD 24 has already established communication therewith, prior to operation 64, then the vehicle controller 14 may prompt the user whether he/she would like to use the PCD 24 that is already communicating with the vehicle controller 14 as the PCD 24 to identify the administrator or the member. In general, operations 54, 56, and 57 are performed to establish the identity of the administrator for storage of the same on the biometric database 27, 31 and operations 60, 62, 64 and 66 are performed to identify the presence of the administrator after the user has established himself/herself as the administrator. For example, the user may perform operations 54, 56, and 57 to setup him/her as the administrator for that particular vehicle 12. After which, the administrator may simply link his/her PCD 24 or enter his/her PIN to simply notify the biometric database 27, 31 that the administrator is present and can modify the biometric information in the manner set forth herein.

Likewise, the operations 54, 58, and 59 are performed to establish the identity of the user for storage of the same on the biometric database 27, 31 and operations 60, 62, 64 and 66 are performed to identify the presence of the member after the user has established himself/herself as the member. For example, the user may perform operations 54, 58, and 59 to setup him/her as the member for that particular vehicle 12. After which, the member may simply link his/her PCD 24 or enter his/her PIN to simply notify the biometric database 27, 31 that the member is present and can modify the biometric information in the manner set forth herein.

It is recognized that the user may establish himself/herself as an administrator or an authorized member without the use of the ignition key devices 22 as used in connection with operation 56. For example, operation 56 and 58 as noted above may be replaced such that the owner of the vehicle is provided with a master code from the dealer upon purchase of the vehicle 12. In this case, the user interface 16 may receive the master code from the owner in which the owner designates himself/herself as the administrator and then proceeds to operations 60, 62, 64 or 66 to select the manner in which the administrator is to be identified to the biometric database 27. It is further recognized that the master code may be a temporary password that is used initially for purposes of establishing one as an administrator. Once the administrator is established in the biometric database, the vehicle controller 14 may delete the master code. In addition, the administrator, once established, may then select an option via the user interface 16 (after inputting his/her PIN or electrically coupling his/her PCD 24) to generate a member code for a member that is to be added to the biometric database 27, 31. The process utilized to establish the member via the member code is also performed without the use of the ignition key device 22 as used in connection with operation 58.

Figure 3:
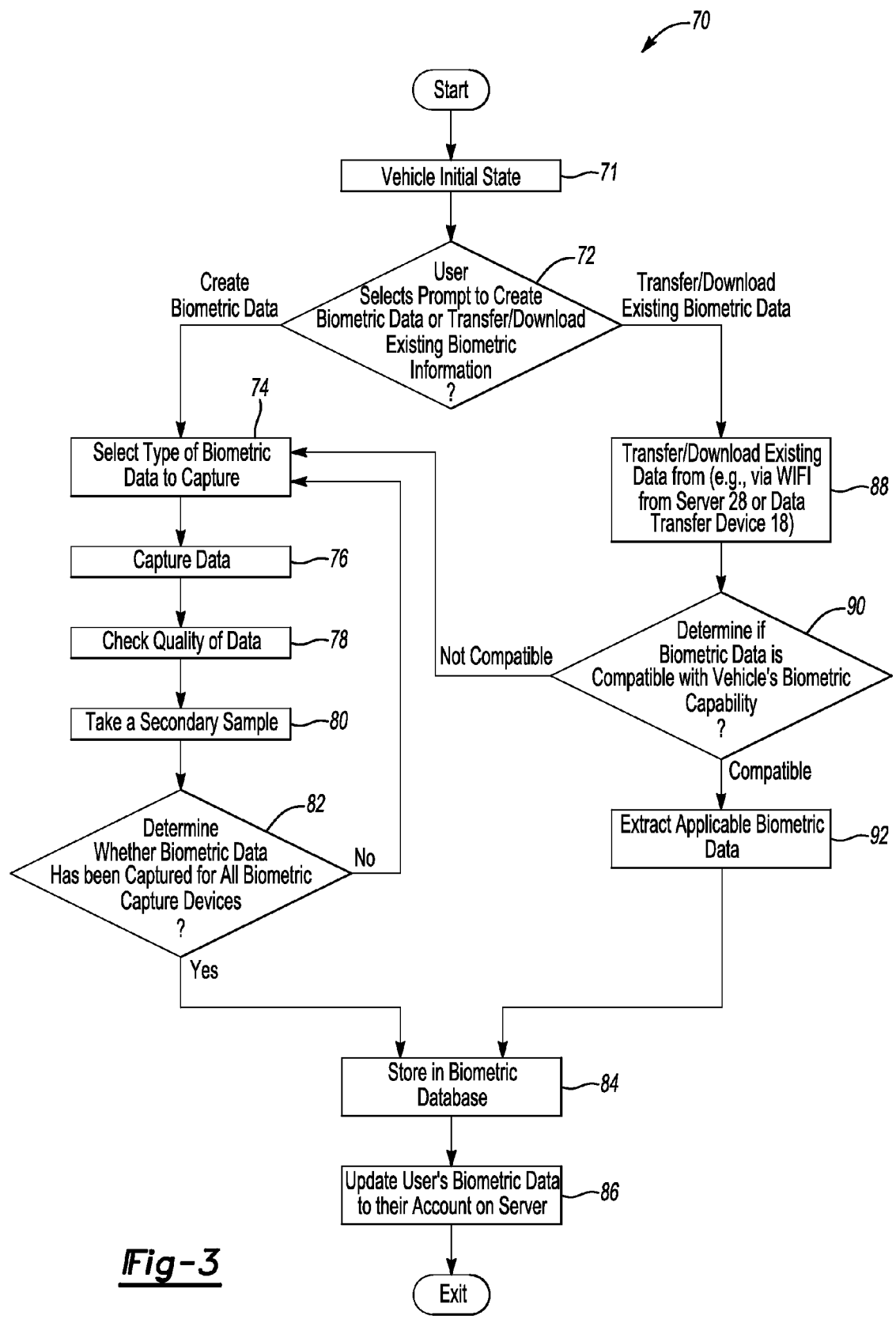
FIG. 3 depicts a method for creating the biometric data or for transferring existing biometric data in accordance to one embodiment.

FIG. 3 depicts a method 70 for creating the biometric data or for transferring existing biometric data in accordance to one embodiment.

In operation 71, the vehicle 12 is running and in PARK. For example, the vehicle controller 14 determines that the ignition status is in the "RUN" position and that the vehicle is in "PARK" based on signals IGN STS and TRANS STS prior to enabling the user the ability to establish himself/herself as an administrator or a user. To accomplish the above, the user may use the PATS based ignition key device 22 or the PEPS based ignition key device 22 to place the ignition status into the "RUN" position. By maintaining that the vehicle 12 is running and in PARK, this condition may ensure that the battery state of charge is not diminished while various operations of the method 70 are executed.

In operation 72, the user interface 16 provides a prompt for selection by the user. The prompt corresponds to creating biometric data for the user or to transferring/downloading existing biometric data. If the user selects the prompt to create biometric data, then the method 70 moves to operation 74. If the user selects the prompt to transfer/download existing biometric data, then the method 70 moves to operation 88. It is recognized that the user may optionally identify himself/herself to the biometric database 27, 31 by connecting the PCD 24 to the vehicle 12 or by inserting his/her PIN prior to the user creating the biometric data or transferring existing biometric data.

In operation 74, the user interface 16 provides a prompt for the user to select which type of biometric data is desired to be created and stored on the biometric database 27, 31. For example, the user may select to have an image of his/her face, iris (or retina), or fingerprints captured. In addition, the user may optionally select to have a voice recording thereof captured.

In operation 76, the biometric capture device 28 captures the selected biometric data in accordance to the type selected by the user in connection with operation 74. For example, the user may interface with a camera for facial recognition, a fingerprint scanner for fingerprint storage, or a voice recorder for the voice recording, etc.

In operation 78, the vehicle controller 14 and/or the biometric capture device 28 checks the quality of the data collected (e.g., quality of the captured facial (or iris) image, quality of the captured fingerprint, or quality of the captured voice recording, etc.).

In operation 80, the user interface 16 prompts the user to provide a secondary sample. For example, the user may again interface with the camera to obtain a secondary sample of a facial (or iris) image, the fingerprint scanner to obtain a secondary sample of a fingerprint image, or the voice recorder for a secondary sample of the voice recording, etc.

In operation 82, the biometric capture device 28 or the vehicle controller 14 determines whether the biometric data has been captured via the manner selected (see operation 74). If the biometric data has been captured in the manner selected, then the method 70 moves to operation 84. If not, then the method 70 moves back to operation 74. In general, the apparatus 10 allows additional biometric data to be captured if the previously captured biometric data is inadequate. The captured biometric data is then stored on the biometric database 27 along with its corresponding member.

In operation 84, the biometric database 27 stores the biometric data for comparison to the captured facial/iris/fingerprint images or voice recordings to enable entry into the vehicle 12.

In operation 86, the vehicle 12 transmits the biometric data to the server 30 (e.g., the biometric database 31) to update accordingly.

In operation 88, the user interface 16 prompts the user as to whether the user would like to transfer/download the biometric data (as already saved) from the server 30 (or biometric database 31) or transfer/download the biometric data from the data transfer device 18 (as already saved).

In operation 90, the vehicle controller 14 receives the biometric data via the server 30 or the data transfer device 18 and determines whether the received data is compatible with the vehicle's biometric capability. For example, the vehicle 12 may not be equipped with a camera or a fingerprint scanner, a retinal scanner or voice recorder. In this case, a check is performed to ensure that the type of biometric data for the user that is to be provided to the vehicle is compatible with the vehicle's biometric resources.

In operation 92, the vehicle controller 14 selects the applicable type of biometric data that the vehicle 12 is equipped to handle for purposes of performing the biometric comparison to enable entry into the vehicle. For example, if the vehicle 12 does not include a camera, but does however have a fingerprint scanner, then the vehicle controller 14 selects the fingerprint data for the user as provided by the server 30. Likewise, if the vehicle 12 does not include a fingerprint scanner but does however have a camera, then the vehicle controller 14 selects the facial data for the user as provided by the server 30. In the event the vehicle 12 is equipped with a camera, a fingerprint scanner, and a voice recorder, then all three types of data may be uploaded onto the biometric database 31. The foregoing also apples to the retinal/iris scanner.

Figure 4:
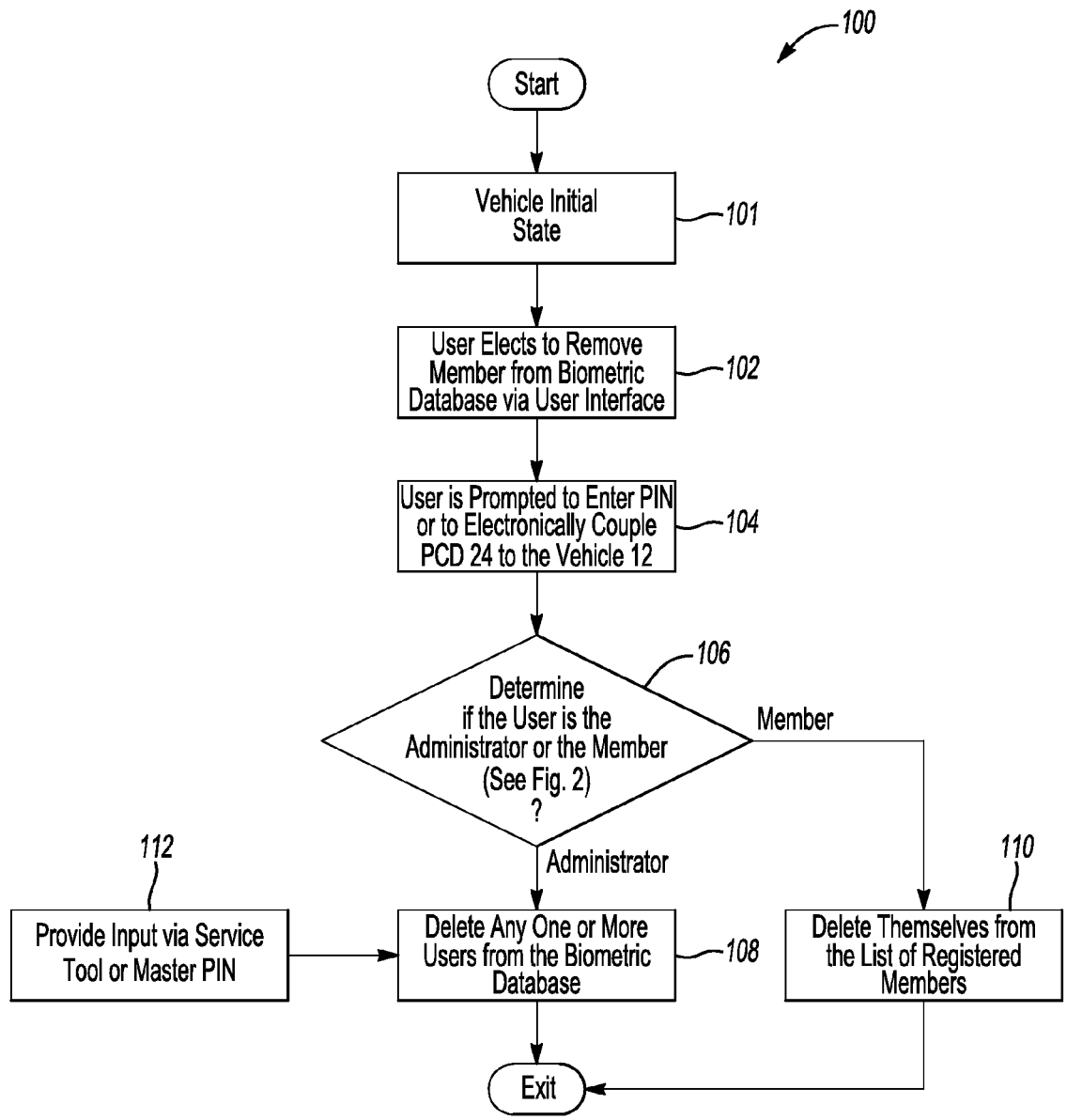
FIG. 4 depicts a method for deleting a member from the biometric database in accordance to one embodiment.

FIG. 4 depicts a method 100 for deleting a member from the biometric database 27, 30 in accordance to one embodiment.

In operation 101, the vehicle 12 is running and in PARK. For example, the vehicle controller 14 determines that the ignition status is in the "RUN" position and that the vehicle is in "PARK" based on signals IGN_STS and TRANS_STS (see FIG. 1) prior to enabling the user the ability to establish himself/herself as an administrator or authorized user. To accomplish the above, the user may use the PATS based ignition key device 22 or the PEPS based ignition key device 22 to place the ignition status into the "RUN" position. By maintaining that the vehicle 12 is running and in PARK, this condition may ensure that the battery state of charge is not diminished while various operations of the method 100 are executed.

In operation 102, the user interface 16 receives a command from the user to remove a member from the biometric database 27, 31.

In operation 104, the user interface 16 prompts the user to enter the PIN as established in operation 62 of FIG. 2 or to electrically couple his/her PCD 24 to the vehicle via Bluetooth as established in operation 64 of FIG. 2.

In operation 106, the vehicle controller 14 determines whether the user is the administrator or the member as noted in connection with operation 54 of FIG. 1. If the user is the administrator, then the method 100 moves to operation 108. If the user is the member, then the method 100 moves to operation 110.

In operation 108, the user interface 16 enables the administrator to delete any one or more of the members from the biometric database 27. For example, the user interface 16 communicates with the vehicle controller 14 to delete the selected user from the biometric database 27. The vehicle controller 14 may communicate with the server 30 such that the server 30 deletes the member and the accompanying biometric data for that respective member within the biometric database 31.

It is also recognized that operation 112 may be performed to delete any one or more users from the biometric database 27, 31. For example, in operation 112, an authorized dealer or service personnel may utilize a diagnostic tool for communicating with the vehicle controller 14 to delete any one or more of the members in the event such dealer or service personnel is instructed to do so by the administrator. Alternatively, the authorized dealer or service personnel may have a master PIN that allows the same to delete any one or more users from the biometric database 27, 31.

In operation 110, the user interface 16 enables the member to delete himself/herself from the biometric database 27. For example, the user interface 16 communicates with the vehicle controller 14 to delete the member from the biometric database. The vehicle controller 14 may communicate with the server 30 to delete the member and the accompanying biometric data for the member.

Figure 5:
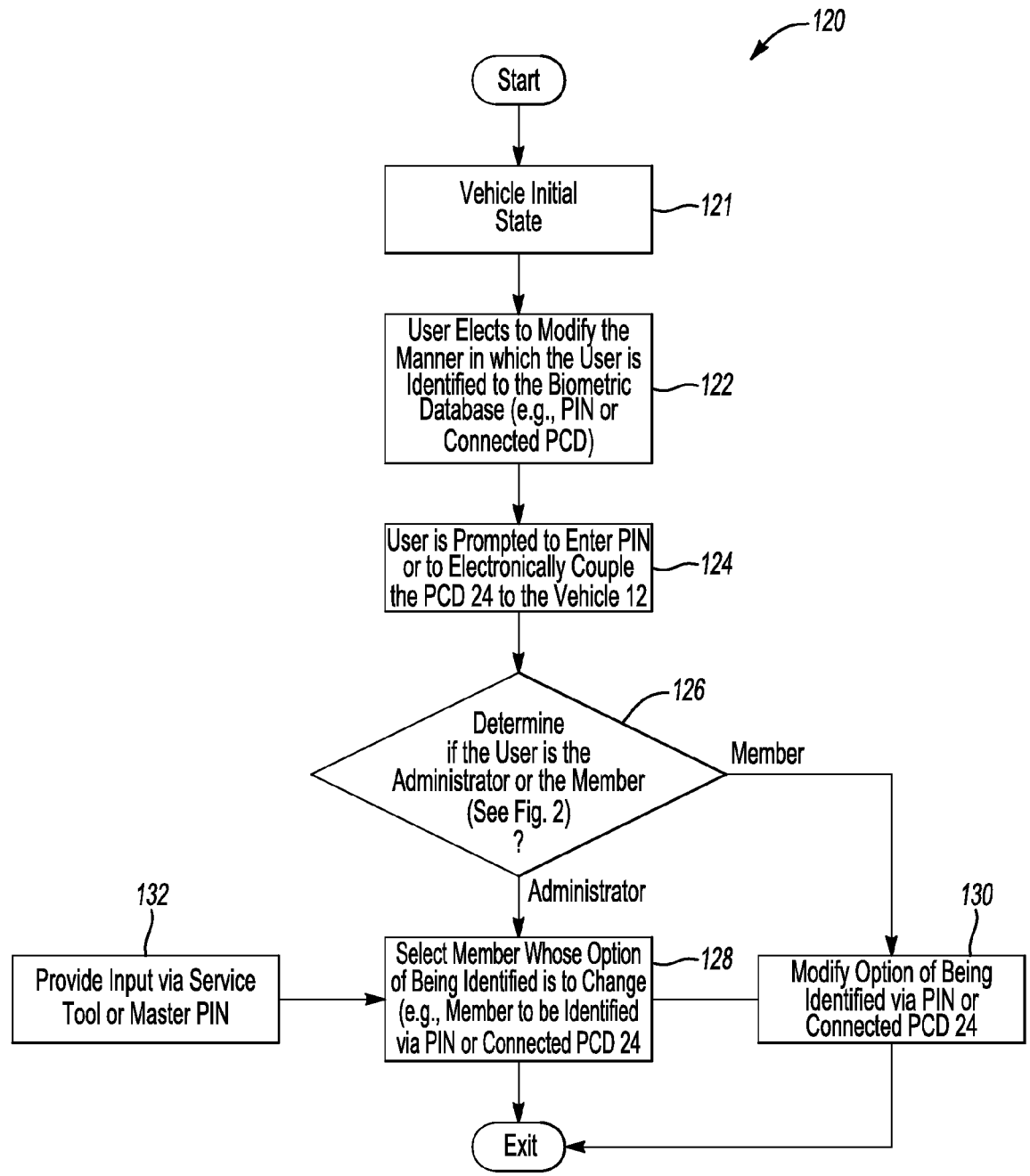
FIG. 5 depicts a method for modifying the manner in which the administrator or the member is identified to the biometric database in accordance to one embodiment.

FIG. 5 depicts a method 120 for modifying the manner in which the administrator or the member is identified to the biometric database 27, 31 in accordance to one embodiment.

In operation 121, the vehicle 12 is running and in PARK. For example, the vehicle controller 14 determines that the ignition status is in the "RUN" position and that the vehicle is in "PARK" based on signals IGN_STS and TRANS_STS prior to enabling the user the ability to establish himself/herself as an administrator or authorized user. To accomplish the above, the user may use the PATS based ignition key device 22 or the PEPS based ignition key device 22 to place the ignition status into the "RUN" position. By maintaining that the vehicle 12 is running and in PARK, this condition may ensure that the battery state of charge is not diminished while various operations of the method 50 are executed.

In operation 122, the user interface 16 receives a command from the user to modify the manner in which user is identified to the biometric database.

In operation 124, the user interface 16 prompts the user to enter the PIN as established in operation 62 of FIG. 2 or to electrically couple his/her PCD 24 to the vehicle via Bluetooth as established in operation 64 of FIG. 2.

In operation 126, the vehicle controller 14 determines whether the user is the administrator or the member as established in connection with operation 54 of FIG. 1. If the user is the administrator, then the method 120 moves to operation 128. If the user is the member, then the method 120 moves to operation 130.

In operation 128, the user interface 16 enables the administrator to modify the manner in which a member is identified to the biometric database 27, 31. For example, the user interface 16 communicates with the vehicle controller 14 to change such that the member is required to input a PIN or that the member is required to electrically connect his/her PCD 24. The vehicle controller 14 may communicate with the server 30 to modify the manner in which the selected member is to identify himself/herself to the biometric database 27, 31.

It is also recognized that operation 132 may be performed to modify the manner in which any member may be identified to the biometric database 27, 31. For example, in operation 132, an authorized dealer or service personnel may utilize a diagnostic tool for communicating with the vehicle controller 14 to modify the manner in which any one or more of the members are identified to the biometric database 27, 31 (e.g., PIN or connected PCD 24) in the event such dealer or service personnel is instructed to do so by the administrator. Alternatively, the authorized dealer or service personnel may have a master PIN that allows the same to modify the manner in which any one or more of the members are identified to the biometric database.

In operation 130, the user interface 16 enables the member to modify the manner in which the member is identified to the biometric database 27, 31. For example, the user interface 16 communicates with the vehicle controller 14 to change such that the member is required to input a PIN or that the member is required to electrically connect his/her PCD 24. The vehicle controller 14 may communicate with the server 30 to modify the manner in which the member is to identify himself/herself to the biometric database.

In another embodiment, an original equipment manufacturer (OEM) developed or third party front end that is provided to manage the user's vehicle personalization, biometric data, etc., the administrator, as established at the time of vehicle 12 purchase via unique passcode (e.g., PIN), time constrained password, etc. may add, delete data or manage members. At that point, the administrator (or user) may have the option of pushing the information (e.g., any additions, deletions, or information regarding the management of members) to the vehicle 12 in a next driver cycle. At that point, the administrator (or user) can confirm the download, or if may occur automatically. Alternatively, the user/admin may select to pull the data at the next driver cycle, based on a user/admin invoked request to update.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for managing biometric information for a vehicle, the apparatus comprising:
    a first key and a second key, each physically separates from each other, and each including an electronic transmitter positioned thereon for transmitting an access signal to the vehicle;
    a vehicle controller for receiving the access signal from one of the first key and the second key to enable operation of the vehicle, the vehicle controller being operably coupled to a biometric database for storing first data indicative of an administrator and second data indicative of at least one of a member and biometric information for the member, the vehicle controller being configured to:
    electronically receive the access signal from the first key at a first time instance;
    electronically receive the access signal from the second key at a second time instance;
    determine a first time duration between the first time instance and the second time instance;
    determine whether the first time duration is less than a predetermined time frame; and determine that a user is the administrator in response to determining that the first time duration is less than the predetermined time frame.

2. The apparatus of claim 1 wherein the vehicle controller is further configured to electronically receive a first indication indicative of a request to indicate that the user is the administrator prior to receiving the access signal from each of the first key and the second key.

3. The apparatus of claim 1 wherein the vehicle controller is further configured to electrically receive a first indication indicative of a request to identify the administrator to the vehicle via a personal communication device (PCD) associated with the administrator.

4. The apparatus of claim 3 wherein the vehicle controller is further configured to detect a communication signal from the PCD associated with the administrator in response to the first indication thereby enabling the biometric database to recognize that the administrator is present about the vehicle.

5. The apparatus of claim 1 wherein the vehicle controller is further configured to add or remove the member from the biometric database in response to an electronic command as provided by the administrator.

6. The apparatus of claim 1 wherein the vehicle controller is further configured to modify the biometric information for the member in response to an electronic command as provided by one of the administrator and the member.

7. The apparatus of claim 1 wherein the biometric database is positioned in one of the vehicle and a server positioned away from the vehicle.

8. The apparatus of claim 1 wherein the administrator has greater control over vehicle functionality than that of the member.

9. The apparatus of claim 1 wherein each of the first key and the second key is used in connection with one of a passive anti-theft system (PATS) and a passive entry passive start (PEPS) system.

10. An apparatus for managing biometric information for a vehicle, the apparatus comprising:
   a first key and a second key, each physically separated from each other, and each including an electronic transmitter for transmitting an access signal to the vehicle; and
   a vehicle controller being operably coupled to a biometric database to store first data indicative of an administrator and second data indicative of at least one of a member and biometric information for the member, the vehicle controller being configured to:
   electronically receive the access signal from each of the first key at a first time instance;
   electronically receive the access signal from the second key at a second time instance;
   determine a first time duration between the first time instance and the second time instance;
   determine whether the first time duration is less than a predetermined time frame; and
   determine that a user is the administrator in response to determining that the first time duration is less than the predetermined time frame.

11. The apparatus of claim 10 wherein the vehicle controller is further configured to electronically receive a first indication indicative of a request to indicate that the user is the administrator prior to receiving the access signal from each of the first key and the second key.

12. The apparatus of claim 10 wherein the vehicle controller is further configured to electrically receive a first indication indicative of a request to identify the administrator to the vehicle via a personal communication device (PCD) associated with the administrator.

13. The apparatus of claim 12 wherein the vehicle controller is further configured to detect a communication signal from the PCD associated with the administrator in response to the first indication thereby enabling the biometric database to recognize that the administrator is present about the vehicle.

14. The apparatus of claim 10 wherein the vehicle controller is further configured to add or remove the member from the biometric database in response to an electronic command as provided by the administrator.

15. The apparatus of claim 10 wherein the vehicle controller is further configured to modify the biometric information for the member in response to an electronic command as provided by one of the administrator and the member.

16. The apparatus of claim 10 wherein the biometric database is positioned in one of the vehicle and a server positioned away from the vehicle.

17. The apparatus of claim 10 wherein the administrator has greater control over vehicle functionality than that of the member.

* * * * *